Aug. 22, 1950 A. LINDQUIST ET AL 2,519,485

AUTOGRAPHIC REGISTER AND THE LIKE

Filed Dec. 15, 1945

INVENTORS
ARVID LINDQUIST,
PAUL DE WALL,
BY
Toulmin & Toulmin
ATTORNEYS

Patented Aug. 22, 1950 2,519,485

UNITED STATES PATENT OFFICE 2,519,485

AUTOGRAPHIC REGISTER AND THE LIKE

Arvid Lindquist, Copenhagen, and Paul de Waal, Gentofte, Denmark

Application December 15, 1945, Serial No. 635,221
In Denmark December 23, 1944

2 Claims. (Cl. 282—12)

Figure 1:
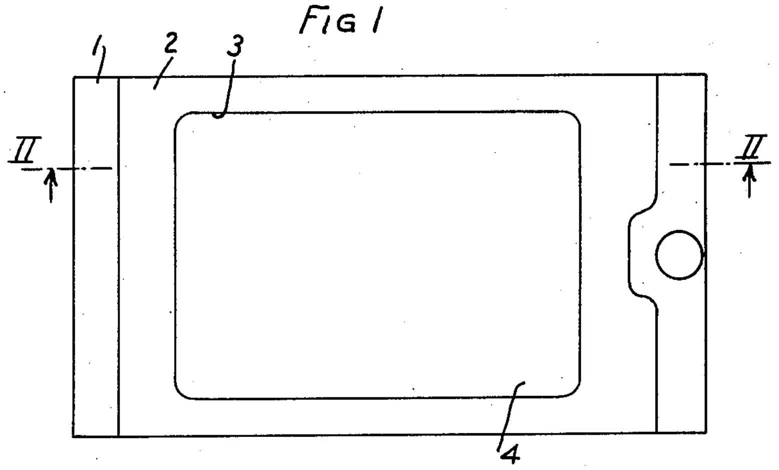

This invention relates to autographic registers of the kind comprising a casing containing a pack of continuous stationary forms, which may be interfolded or interleaved so that carbon paper or the like may be introduced between the folds or leaves at a convenient point according to the number of copies required.

Various arrangements are known for introducing the carbon paper or the like. The casing is provided with an opening on one side exposing a writing plate and the arrangement is such that one or more of the forms can be drawn out through a slot and pulled over the writing plate where the necessary inscriptions are made and the used form or forms, according to the number of copies made, are torn off and one or more of them is retained as a record and is passed back into a separate compartment provided in the casing.

Usually the compartment for the record forms is arranged below the compartment containing the supply pack and a closure flap is provided therefore. This arrangement of the two compartments, one above the other, necessitates the use of a somewhat bulky casing.

The object of the present invention is to provide an improved construction of autographic register of the above type, which is of smaller dimensions than usual but which still enables forms of the usual size and supply packs of the usual thickness and number of forms to be used.

The invention is based on the realisation of the fact that it is not necessary for the compartment for the record forms to have a fixed constant capacity. It is empty at the beginning of the operation of the register, when the supply compartment is filled with the supply of forms, and will only fill up as the supply of forms in the pack decreases.

According to the invention, an autographic register of the kind referred to is provided with a single compartment which is adapted to contain both the supply pack and the record forms, and a movable member is provided which automatically separates the supply pack from the space into which the record forms are to be placed. A slot is provided at one end of the space for the introduction of the record forms and the movable member changes its position in accordance with the size of the piles of forms in the two spaces.

In one suitable arrangement, the movable member comprises a pivoted plate-like part so shaped that when the register casing is placed with the writing plate uppermost in writing position, the member rests beneath the supply pack in the casing and more or less closes the slot through which the record forms are introduced. If the register is now turned over to bring the writing plate underneath, then the movable member uncovers the slot for the record forms and also rests on the back of the pack, so that a record form introduced through the slot slides into position over the supply pack but is kept separated therefrom by the movable member. Instead of a pivoted movable member, a suitably shaped plate or the like sliding on pins, may be arranged to move in a plane parallel to itself under the influence of its own weight.

Figure 2:
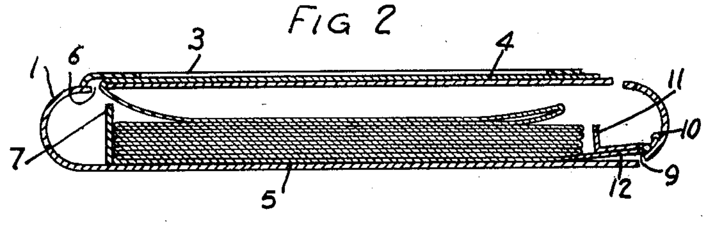
Figure 3:
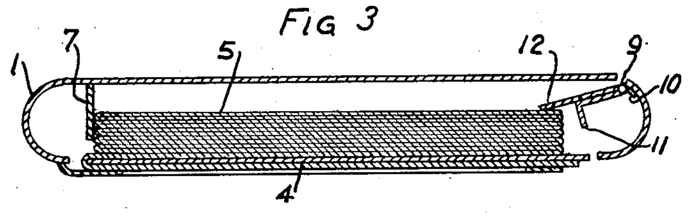
Figure 4:
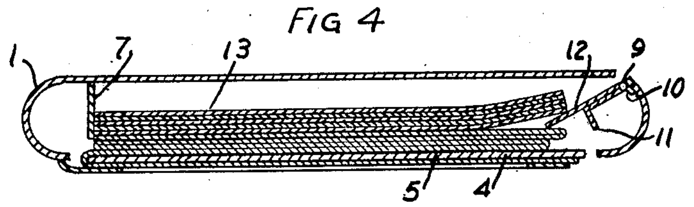

To enable the invention to be fully understood it will now be described by reference to the accompanying drawing, in which:

Fig. 1 is a front elevation of a register having one form of the invention applied thereto, shown diagrammatically, and Fig. 2 is a sectional elevation on the line II—II, Fig. 1, Figs. 3 and 4 are views similar to Fig. 2, but showing the register turned upside down to illustrate the operation thereof.

It will be understood that the drawings are diagrammatic as the invention is not concerned with the general construction of the register. As shown, the apparatus comprises the usual casing 1 having a cover plate 2 with an opening or window 3 which exposes a writing plate 4. The casing contains a supply pack 5 of the usual type of continuous stationery and in use the top forms from the pack are passed up through the slot 6 and drawn over the writing plate 4 where the inscription is made. This operation is well known and is not illustrated for the sake of clarity.

The casing is provided with a stop 7 to limit the movement of the forms. It will be noted that the casing is not divided into separate compartments for the supply pack and the record forms but a slot 9 is provided for the introduction of the record forms and the division is effected by means of a member which is pivoted to the casing at 10 and comprises an upstanding stop member 11 and a flat base member 12 (Fig. 2).

When the register is placed with the writing plate 4 uppermost, as in Fig. 2, and a supply pack 5 is in position, the pack lies on the top of the base member 12 and the part 11 acts as a stop for the pack, the member 12 closing the slot 9 as clearly shown.

In this position the forms can be drawn from the pack, over the writing plate 4, and used, and the record forms torn off. To introduce the record form or forms into the slot 9, the register is turned over into the position shown in Fig. 3. In this position the member 11, 12 has moved, and the slot 9 is open and the record form or forms can be introduced into the slot 9 when they will slide over the base plate 12 and rest on the pack 5 with one end resting on the plate 12, so that they are separated from the pack 5. The register is then turned into the writing position of Fig. 2 and the operations repeated.

Fig. 4 shows the register when it has been used for some time and the supply pack 5 is nearly exhausted, the record forms 13 being piled above it and separated by the base plate 12.

The space for the records increases as the size of the pack diminishes. The use of the pivoted member 11, 12 also obviates the need for a separate closure for the slot 9, as in the position shown in Fig. 2, in which the record forms are liable to slip out through the slot, the base plate 12 rests against the forms and prevents them from slipping out.

We claim:

1. An autographic register comprising, a substantially rectangular hollow casing having a single paper receiving compartment to receive a pack of unused fan folded form sets and used form sheets torn from the pack and including a writing table on one side thereof, a slot in said casing transversely thereof at one end of said compartment and said writing table through which unused fan folded forms are drawn from said compartment and across said writing table, a second slot in said casing transversely thereof at the opposite end of said compartment and on the opposite side of said casing from said first slot and parallel to said first slot to receive used forms torn from the pack for introduction into said compartment at the opposite side thereof from that through which unused forms are removed from the compartment, and a movable wall member freely rotatable on a pivot axis within said compartment when said casing is positioned alternately with the writing table face up and face down, said member having a horizontal part with one end thereof in juxtaposition with said second slot to maintain separation between unused forms on one side of said member and used forms on the opposite side thereof in said compartment upon insertion of used forms thereinto, and pivot means pivotally mounting said one end of said member within said casing on an axis parallel with said second slot.

2. An autographic register comprising, a substantially rectangular hollow casing having a single paper receiving compartment to receive a pack of unused fan folded form sets and used form sheets torn from the pack and including a writing table on one side thereof, a slot in said casing transversely thereof at one end of said compartment and said writing table through which unused fan folded forms are drawn from said compartment and across said writing table, a second slot in said casing transversely thereof at the opposite end of said compartment and on the opposite side of said casing from said first slot and parallel to said first slot to receive used forms torn from the pack for introduction into said compartment at the opposite side thereof from that through which unused forms are removed from the compartment, and a movable wall member freely rotatable on a pivot axis within said compartment when said casing is positioned alternately with the writing table face up and face down, said member having a horizontal part with one end thereof in juxtaposition with said second slot to maintain separation between unused forms on one side of said member and used forms on the opposite side thereof in said compartment upon insertion of used forms thereinto and a vertical part on said horizontal part and projecting toward said writing table and engageable with one end of a pack positioned on said horizontal part, said member including pivot means at the said one end thereof pivotally mounting the said member adjacent the said second slot on an axis parallel thereto.

ARVID LINDQUIST.
PAUL DE WAAL.

REFERENCES CITED

The following references are of record in the file of this patent:

UNITED STATES PATENTS

| Number | Name | Date |
|---|---|---|
| 612,906 | King | Oct. 25, 1898 |
| 1,902,284 | Jensen | Mar. 21, 1933 |
| 1,971,684 | Hoppe | Aug. 28, 1934 |
| 2,298,594 | Rueger | Oct. 13, 1942 |